May 1, 1956 O. KORNEI 2,743,507

METHOD OF MAKING MAGNETIC TRANSDUCER HEADS

Original Filed June 8, 1951 2 Sheets-Sheet 1

INVENTOR.
OTTO KORNEI
BY
Eber J. Hyde
ATTORNEY

May 1, 1956 O. KORNEI 2,743,507

METHOD OF MAKING MAGNETIC TRANSDUCER HEADS

Original Filed June 8, 1951

2 Sheets-Sheet 2

INVENTOR.
OTTO KORNEI
BY
Elbert J. Hyde
ATTORNEY

United States Patent Office 2,743,507
Patented May 1, 1956

2,743,507

METHOD OF MAKING MAGNETIC TRANSDUCER HEADS

Otto Kornei, Cleveland Heights, Ohio, assignor, by mesne assignments, to Clevite Corporation, Cleveland, Ohio, a corporation of Ohio Original application June 8, 1951, Serial No. 230,455. Divided and this application February 18, 1953, Serial No. 337,463

5 Claims. (Cl. 29—155.5)

Figures 1, 2, 3, 3A, 4:
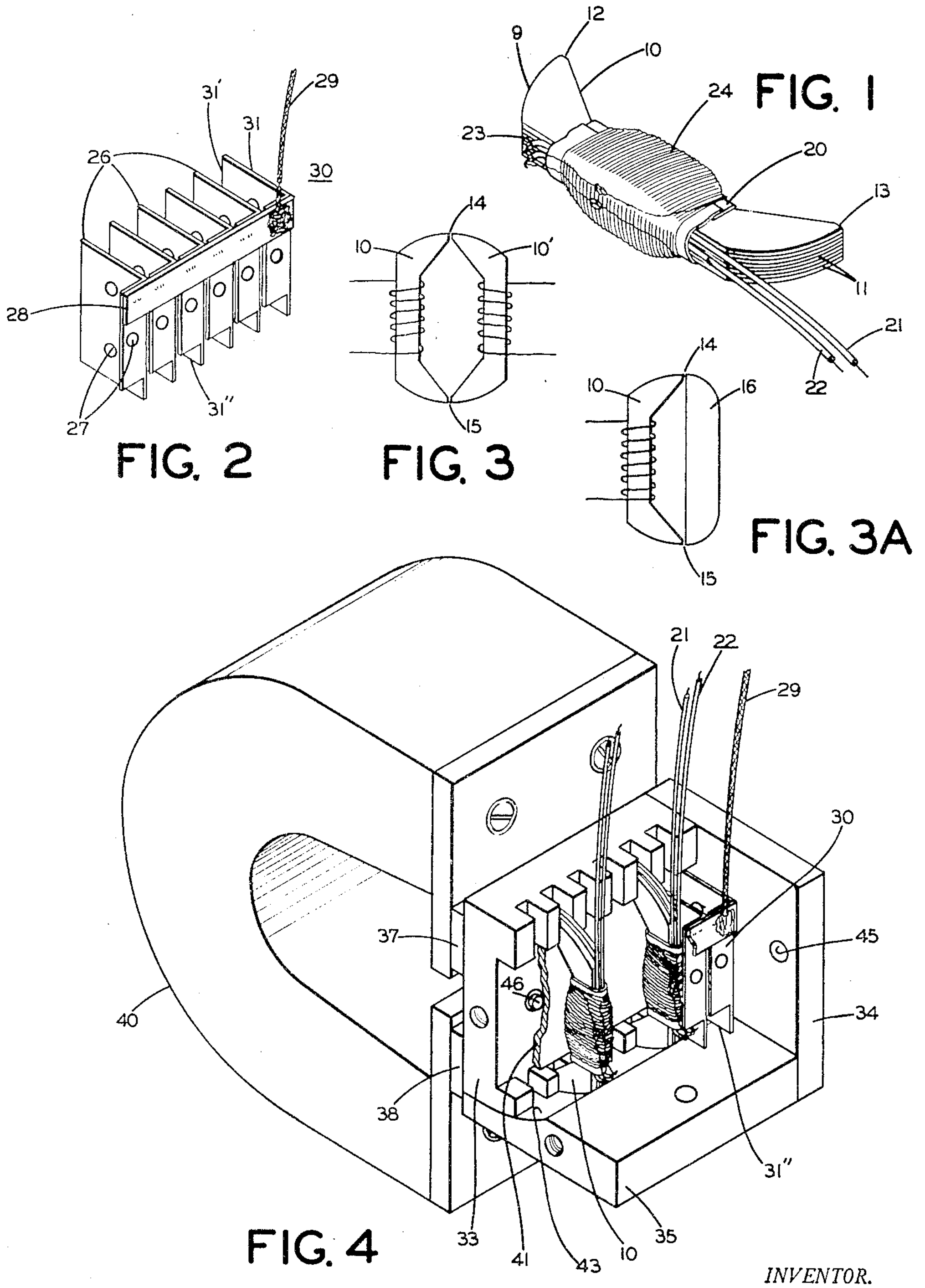

This application is a division of application Serial No. 230,455, filed June 8, 1951, now abandoned for Magnetic Transducer Head and Method of Making Same.

This invention pertains to a magnetic transducer head for use with magnetic recording and reproducing equipment, and to the method of making it. In particular, it pertains to methods of and means for the construction of multichannel heads, and of single channel heads produced in substantially similar ways.

In the past, whenever a plurality of closely adjacent magnetic recording tracks was required, the problem was usually solved by arranging a plurality of magnetic heads in staggered formation along the record member. This arrangement was necessitated by the comparatively large physical dimensions of the individual heads which did not permit a side-by-side arrangement with sufficiently small spacing. The total longitudinal extension of the whole array of heads became, therefore, quite substantial and prohibitive in many cases.

The construction of individual heads also caused frequent non-uniformity of quality, primarily because of irregularities of the head gaps.

Also, the described construction did not, obviously, permit an "in-line" arrangement of the individual head gaps, a feature which is frequently required when an accurate phase comparison between the recorded tracks is desired.

Some of the enumerated shortcomings even existed, though to a lesser extent, when attempts were made to construct multichannel magnetic heads by clamping or otherwise assembling a plurality of individual heads into one single unit.

It is an object of the present invention to provide a multichannel head, and the method of making it, wherein the individual heads making up the multichannel head are closely spaced to more efficiently use the available area of the record member.

Another object of the present invention is to provide a multichannel head, and the method of making it, wherein the recording-reproducing gaps in the several heads are substantially perfectly aligned across the entire head.

Another object of the present invention is to provide a multichannel head, and the method of making it, wherein each of the individual recording-reproducing gaps is of uniform length across the pole pieces defining the gaps, wherein the lengths of the gaps in the several heads are equal.

A further object of the invention is to provide a multitrack magnetic trasducer head wherein the individual heads are shielded from each other.

Another object of the present invention is to provide means for grounding the pole pieces and the shim in the air gap of a magnetic-transducer head.

Another object of the invention is to protect a magnetic-transducer head against moisture and fungus growth.

Still another object of the invention is to construct a magnetic-transducer head so that vibration does not adversely influence its operating characteristics.

Another object of the present invention is to provide a single track magnetic recorder-reproducer head, and the method of making same, wherein the gap is of uniform length across the pole pieces defining the gap.

In accordance with the invention there is provided a magnetic-transducer head comprising a plurality of individual ring heads each of which includes pole piece means defining a gap, and coil means. Hardened casting material substantially surrounds the head securing them together in predetermined fixed relationship to each other and with the air gap area of the several pole piece means extending out from the material.

Another aspect of the invention lies in the method of making a multichannel transducer head by holding, in side-by-side spaced apart relationship, a plurality of pole piece means each having end faces, and filling the space between the pole piece means with hardenable liquid material until the pole piece means are substantially embedded. The liquid material is caused to harden and the end faces of the pole piece means are then ground to expose the end faces and to align them in a plane. Another head portion is formed in a manner similar to the aforedescribed process with the end faces of the second portion forming a mirror image of the end faces of the first portion. These two portions are then assembled with the end faces in closely spaced face-to-face relationship and with the pole piece means of one portion cooperating with the pole piece means of the other portion to form a plurality of substantially closed ring heads. The two portions are then secured together in their aligned position.

Still another aspect of the invention lies in the method of making a transducer head of the single channel type, wherein a plurality of ring head structures are held in side-by-side spaced apart relationship while the spaces between the individual structures are filled with hardenable liquid material to substantially embed the heads. The liquid material is then caused to harden and the hardened material in the spaces between the ring structures is cut to separate the multiple head into a plurality of individual heads.

For a better understanding of the present invention, together with other and further objects thereof, reference is had to the following description taken in connection with the accompanying drawings, and its scope will be pointed out in the appended claims.

Figures 5, 6, 7, 8, 9, 10:
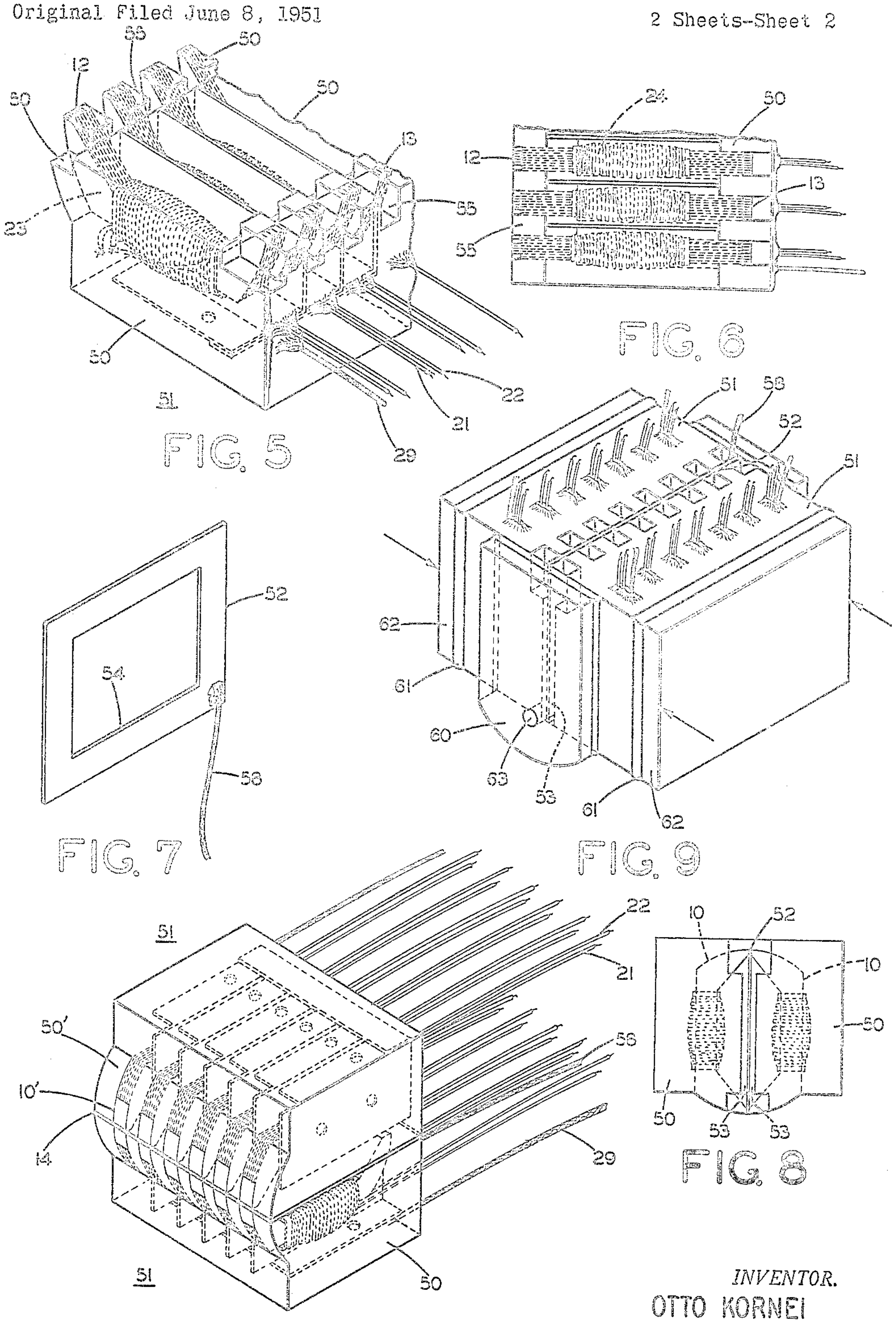

In the drawings:

Figure 1 is an isometric view of a pole piece and coil assembly which forms part of a magnetic transducer head. Figure 2 is an isometric view of the shield structure used in a multichannel head. Figure 3 shows two of the core portions of Figure 1 in face-to-face relationship to form a ring head; Figure 3–A shows one of the core portions of Figure 1 and a dissimilar core portion forming another ring head; Figure 4 shows the method of, and a fixture for, holding a plurality of the pole piece assemblies shown in Figure 1 and the shield structure of Figure 2 while the head is being assembled. Figure 5 is an isometric view of one portion of a transducer head as it comes from the fixture shown in Figure 4. Figure 6 is a top view of the head shown in Figure 5. Figure 7 is an isometric view showing one form of shim used in the head. Figure 8 shows two core portions in face-to-face relationship with the shim in position. Figure 9 schematically shows a device for securing two portions of the head together to produce the finished head shown in Figure 9 and Figure 10 shows a completed multichannel head.

With reference to the drawings Figure 1 is an isometric view showing a portion of the pole piece and coil structure of a ring-head for magnetic recording and reproducing purposes.

As is known to the art a "ring head" is a magnetic transducer head comprised of a core of magnetic material defining a magnetic path which is substantially closed except for one or more very narrow "air" gaps, across one of which the record member moves in close proximity to the core. And as known in the art the "air" gap may be filled with non-magnetic material such as aluminium or bronze foil or the like to more positively define the length of the "air" gap and to prevent the gap from becoming filled with magnetic powder from the record member. Two of the portions shown in Figure 1 are put together to form one ring-head, or one of the portions shown is put together with another portion of different shape, Figure 3–A, to form the ring head.

The head portion shown in Figure 1 is comprised of a core 10 preferably, though not necessarily, formed of a plurality of thin laminations 11 which are connected together by adhesive material. The laminations may be made of Permalloy or the like, or the pole piece may be made of a single piece of ferrite or the like. The core portion 10 has two end faces, 12, 13, and when two similar core portions 10 and 10' are put together as shown in Figure 3 the end faces define the top air gap 14 and the bottom air gap 15 of the assembled ring head; and when two dissimilar core portions 10 and 16 are put together the end faces 12, 13 of the pole piece portion 10 define one side of the air gaps 14, 15 and similar face portions on the core portion 16 define the other side of the gaps.

The core portions preferably are comprised of a stack of interconnected laminations 11 about which is wound a thin layer of insulating tape 20 with lead wires 21, 22 interposed between the back face 23 of the core 10 and the insulating tape 20. The coil 24 is then tightly wound about the insulating tape 20 and the two ends of the wire forming the coil 24 are connected to the two ends of the lead wires 21, 22, securely fastening the lead wires to the assembly in a manner such that a pull on the lead wires exerts no strain on the connections with the coil wire.

The shield structure 30, shown in Figure 2, is comprised of a plurality of L-shaped members 26 each having a plurality of holes 27. Each L-shaped member is secured by spot welding to a connecting strip 28 and a ground wire 29 is soldered to the connecting strip 28. The long legs 31 of the L-shaped members 26 are adapted to extend between the pole pieces in multiple head assemblies to shield the individual heads from each other, as will be described more fully. This type of shield construction is highly useful as any number of L-shaped members 26 may be secured to the connecting strip 28, thereby making it very easy to construct multichannel heads comprising any number of individual heads with standard parts. The only part which is individual to a particular head is the connecting strip 28 which length varies with the number of channels in the head.

The head is made by holding a plurality of the pole piece means shown in Figure 1 in side-by-side spaced apart relationship by the assembly fixture shown in Figure 4. The fixture is shown with several of its enclosing sides removed, and only two of the pole piece means 10 are shown in position in the notched member 33. It is to be understood, however, that in the fixture shown any number of pole piece means 10 may be used up to 6, and for heads with more channels a larger fixture may be used.

The fixture is comprised of the notched member 33, side member 34, bottom member 35, and other enclosing side members which are not shown, all preferably made of non-magnetic metal. First and second iron strips 37, 38 are connected to the outside of the notched member 33 and extend the length of the member to the end of the notches, and a permanent magnet 40 is connected across the two spaced apart iron strips 37, 38. A spacer bar 41, shown broken away, is located between the two rows of notches with which the member 33 is provided, for a purpose to be more fully described.

The desired number of pole piece portions 10 are then placed in proper position in the fixture with the top and bottom pole tips in the top and bottom notches and with the end faces 12, 13 held tightly against the fixture by means of the force exerted upon the pole pieces by the magnet 40. The side walls defining the notches accurately space the several pole pieces in a lateral direction. The shield structure 30 is then put in place with the ends 31' of the legs 31 against the spacer bar 41 and with the ends 31'' against the bottom 35 of the fixture. In the position shown in Figure 4 the head is upside-down; that is the lead wires 21, 22 and ground wire 29 from the shield 30 extend upwardly. The bottom member 35 of the fixture has a curved section 43 against which the curved section 9 of the pole piece portions 10 rest, the two curvatures being substantially the same so that the curved portion 43 of the bottom member 35 substantially covers one end of the pole piece portions 10, and serves to very accurately position each of the pole piece portions in a vertical direction with respect to the other pole piece portions. For the sake of clarity only two pole piece portions are shown in place in Figure 4, but it is to be understood that the illustrated fixture will hold any number up to six.

After the several pole piece portions and the shield structure 30 have been properly positioned and are securely held by the magnet 40 the other side walls and the top of the fixture are connected in place. Screw holes 45 are shown for holding the parts together. Suitable means are provided for filling the fixture with hardenable liquid material such as the material known as "Hysol 6020" manufactured by the Ciba Corporation or any similar material. It is preferred to fill the fixture from an opening at or near the bottom; thus, the liquid material, upon rising in the fixture, displaces the air, avoiding the inclusion of air bubbles in the casting. The liquid material is caused to harden and the cast half-portion of the head is then removed from the fixture.

The spacer bar 41 is used to help remove the half-head portion from the mold. Two bolts 46 (only one of which is shown) extend through the notched wall portion 33 of the fixture and bear against the face of the bar 41. After the fixture is opened by removing the side walls the two bolts 46 are turned forcing the bar 41 against the cast material 50 and causing the pole piece tips to move straight out of the notches in the wall portion 33. The head portion 51 formed by this process is one-half of a complete transducer head, and is illustrated in Figures 5 and 6.

Another head portion is made preferably in the same or an identical fixture by the same process, or another head portion of different configuration such as that shown in Figure 3–A is made. It is important, however, that the exposed end faces of the two head portions which are secured together to form a head with the end faces defining the air gaps should be mirror images of each other. If this is true the width of the matching pole tips will be identical, the spacing between heads will be identical, and the pole faces will be in planes perfectly parallel to each other. When these conditions are obtained the two halves 51 of the head can be secured together to form a plurality of perfect ring-heads, even though, as shown in Figure 3–A the two core portions, 10, 16 are not identical.

The method of treating each of the halves 51 of the head, and the method of securing the two portions together in order to obtain perfect alignment and perfect matching of pole faces is important.

After the two individual heads portions 51 have been cast each portion is further processed before the two portions are secured together in order to clean off any of the casting material from the pole faces 12, 13 and of even more importance, to align all of the pole faces of each portion in a plane. To do this the cast head portion 51 shown in Figure 5 is ground and lapped until all the pole faces 12, 13 are exposed by the desired amount, are smooth and lie in a single plane. Too much care cannot be exercised in this operation because the more perfect the alignment of the pole faces the better the head will be. Single heads cannot be easily constructed in this manner as they do not present sufficient pole face area to the grinding means to produce accurately and economically a perfect plane. Thus, when single heads are required it has been found desirable to produce first multichannel head portions which can be accurately polished, then to secure two of the accurate multiple head portions together, and then to cut the multichannel head into individual ring-heads.

A shim 52, shown in Figure 7, is provided to accurately define the size of the "air" gaps in the core and to exclude dirt and magnetizable material from the gap. The shim is in the form of a frame having a large opening 54, and a ground wire 58 is soldered to it.

After the two cast head portions 51 have been accurately polished they are placed together with their end faces in closely spaced face-to-face relationship on either side of the shim 52 as shown in Figure 8, and they are then held in that position in the casting device shown in Figure 9. A channel 53 extends through the head and the opening 54 in the shim 52 allows hardenable material poured into the channel 53 to contact both halves of the head. The openings 55 between pole tips (shown in Figure 5) permit the hardenable liquid material to flow between the pole piece tips, thus further improving the bond between the two halves. Upon hardening the two halves 51 of the head are securely molded together to form a transducer head, as shown in Figure 10.

Figure 9 schematically shows one type of fixture which serves to bond together the two head halves 51, 51.

The two halves 51, 51 are pressed tightly together in proper alignment and with the shim placed between their confronting faces. In order to obtain even distribution of pressure rubber plates 61 are placed between the outer sides of the two head halves 51, 51 and the pressure plates 62. The plates 62 are then tightened by suitable means, for instance by screws or springs, to press the rubber plates 61 against the outer sides of the two head halves 51, 51. The curved surface of the two head halves is then sealed, for instance by means of a piece of adhesive tape applied to the surface to prevent liquid casting material from flowing out of openings 55 (Figure 5). The channel 53 between the two halves is now sealed off by means of two end plates 60 which are held tightly against the head by suitable means. To improve the sealing a thin layer of resilient material may be placed between each end plate 60 and the head.

Each end plate 60 has an opening 63 located near the lower end of channel 53. The liquid casting material is then introduced through the openings 63 until all voids between the two head halves are filled. Suitable means including the application of vacuum may be provided to control the flow of liquid into the spaces in the head. After the spaces are filled the material is caused to harden before the head is removed from the casting fixture.

After removal from the fixture the area of the pole tips adjacent the gaps is polished slightly on an abrasive material to remove any of the hardened material which may have seeped between the pole piece and the curved portion 43 of the base 35, and in order to produce a smooth and well defined curved surface as a guide for the recording medium.

The finished head block may, finally, be mounted in any kind of suitable housing including terminals for the lead wires, if so desired.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of making a multitrack magnetic transducer head comprising the steps of: forming a first and a second sub-assembly each by providing a plurality of magnetic pole pieces having a pair of pole tip faces, winding coil means about a plurality of said pole pieces, holding all of said pole pieces in a mold in parallel closely spaced side-by-side relationship with their pole tip faces approximately aligned in a plane, while holding said pole pieces in said mold casting a hardenable liquid material into said mold, causing said liquid material to harden to firmly hold said pole pieces in said defined positional relationship, removing from said mold the block of hardened material having embedded in it said positioned pole pieces, lapping said approximately aligned pole tip faces to substantially perfectly align them in a plane; providing thin, non-magnetic spacer means; holding said first and second sub-assemblies in contact with opposite sides of said spacer means and with the pole tip faces of one sub-assembly in registration with the pole tip faces of the other sub-assembly forming a plurality of substantially closed magnetic paths each having at least one of said wound pole pieces; applying hardenable liquid casting material to said two sub-assemblies while holding them in said position; and causing said casting material to harden into a unitary block.

2. The method as set forth in claim 1 further characterized by the step of severing a transducer head from said unitary block by cutting through said hardened plastic material at a location between two adjacent transducer heads in a plane parallel to the plane of the pole pieces.

3. The method of making a multitrack magnetic transducer head comprising the steps of: forming a first and a second sub-assembly each by providing a plurality of C-shaped magnetic pole pieces having a pair of pole tip faces, winding coil means about a plurality of said pole pieces, holding all of said pole pieces in a mold in parallel closely spaced side-by-side relationship with their pole tip faces approximately aligned in a plane and with the mold convex into the concave C-shaped pole pieces, while holding said pole pieces in said mold casting a hardenable liquid material into said mold, causing said liquid material to harden to firmly hold said pole pieces in said defined positional relationship, removing from said mold the block of hardened material having embedded in it said positioned pole pieces, lapping said approximately aligned pole tip faces to substantially perfectly align them in a plane, providing thin non-magnetic spacer means, holding said first and second sub-assemblies in contact with opposite sides of said spacer means and with the pole tip faces of one sub-assembly in registration with the pole tip faces of the other sub-assembly forming a plurality of substantially closed magnetic paths each having at least one of said wound pole pieces and having a cavity between said two blocks, filling said cavity with hardenable liquid casting material, and causing said casting material to harden.

4. The method of making a multitrack magnetic transducer head comprising the steps of: forming a first and a second sub-assembly each by providing a plurality of C-shaped magnetic pole pieces having a pair of pole tip faces, winding coil means about a plurality of said pole pieces, holding all of said pole pieces in a mold in parallel closely spaced side-by-side relationship with their pole tip faces approximately aligned in a plane and with the mold convex into the concave C-shaped pole pieces and with portions of the mold between the pole tip faces, while holding said pole pieces in said mold casting a hardenable liquid material into said mold, causing said liquid material to harden to firmly hold said pole pieces in said defined positional relationship, removing from said mold the block of hardened material having embedded in it said positioned pole pieces, lapping said approximately aligned pole tip faces to substantially perfectly align them in a plane, providing thin non-magnetic spacer means, holding said first and second sub-assemblies in contact with opposite sides of said spacer means and with the pole tip faces of one sub-assembly in registration with the pole tip faces of the other sub-assembly forming a plurality of substantially closed magnetic paths each having at least one of said wound pole pieces and having a cavity between said two blocks and having openings between said pole tips into said cavity, filling said cavity and said openings with hardenable liquid casting material, and causing said casting material to harden.

5. The method of making a multitrack magnetic transducer head comprising the steps of: forming a first and a second sub-assembly each by providing a plurality of magnetic pole pieces having a pair of pole tip faces, winding coil means about a plurality of said pole pieces, holding all of said pole pieces in a mold in parallel closely spaced side-by-side relationship with their pole tip faces approximately aligned in a plane, while holding said pole pieces in said mold casting into said mold a hardenable liquid material which upon hardening has wearing qualities inferior to the wearing qualities of said pole pieces, causing said liquid material to harden to firmly hold said pole pieces in said defined positional relationship, removing from said mold the block of hardened material having embedded in it said positioned pole pieces, lapping said approximately aligned pole tip faces to substantially perfectly align them in a plane and due to the different wearing qualities between said hardened casting material and said pole pieces to cause said pole pieces to protrude from substantially all of said hardened casting material, providing thin, non-magnetic spacer means, holding said first and second sub-assemblies in contact with opposite sides of said spacer means with the pole tip faces of one sub-assembly in registration with the pole tip faces of the other sub-assembly forming a plurality of substantially closed magnetic paths each having at least one of said wound pole pieces, applying hardenable liquid casting material to said two sub-assemblies whole holding them in said position, and causing said casting material to harden.

References Cited in the file of this patent

UNITED STATES PATENTS

| | | |
|---|---|---|
| 2,055,175 | Franz | Sept. 22, 1936 |
| 2,334,584 | Rich | Nov. 16, 1943 |
| 2,592,652 | Buhrendorf | Apr. 15, 1952 |
| 2,615,097 | Camras | Oct. 21, 1952 |
| 2,615,990 | Blaney et al. | Oct. 28, 1952 |
| 2,628,286 | Rettinger | Feb. 10, 1953 |
| 2,637,785 | Charlin | May 5, 1953 |